United States Patent [19]

DiMatteo et al.

[11] 4,145,991

[45] Mar. 27, 1979

[54] ARRANGEMENT FOR SENSING THE GEOMETRIC CHARACTERISTICS OF AN OBJECT

[75] Inventors: Paul L. DiMatteo, Melville; Joseph A. Ross, Fort Salonga; Howard K. Stern, Greenlawn, all of N.Y.

[73] Assignee: Solid Photography Inc., Melville, N.Y.

[21] Appl. No.: 776,991

[22] Filed: Mar. 14, 1977

Related U.S. Application Data

[63] Continuation-in-part of Ser. No. 608,265, Aug. 27, 1975.

[51] Int. Cl.² .................. G01B 11/00; G01B 11/24
[52] U.S. Cl. ................................. 356/375; 356/398
[58] Field of Search .................. 356/2, 156, 171; 250/558, 202; 358/96, 225

[56] References Cited

U.S. PATENT DOCUMENTS 4,004,086  1/1977  Buss .................................. 358/225

OTHER PUBLICATIONS

Pennington et al., "Forming a Stereo View" IBM Tech. Disc. Bull. vol. 12, 8-1969, pp. 452–454.

Primary Examiner—John K. Corbin
Assistant Examiner—Wm. H. Punter
Attorney, Agent, or Firm—Max Fogiel

[57] ABSTRACT

An arrangement for locating points on a surface, in which the surface is irradiated selectively and subdivided into a number of sections. The subdivided sections are made to overlap so that a region of one section overlaps the region of a neighboring section. Images of the irradiated sections are recorded, and then scanned for purposes of defining the location of predetermined points within overlapping regions of the subdivided sections. The location of the points within overlapping regions is dependent on a predetermined relationship of irradiated intensities of the points obtained during the scanning procedure.

14 Claims, 13 Drawing Figures

ARRANGEMENT FOR SENSING THE GEOMETRIC CHARACTERISTICS OF AN OBJECT

BACKGROUND OF THE INVENTION

The present application is a Continuation-in-Part of the parent application Ser. No. 608,265, filed Aug. 27, 1975.

In the reproduction or fabrication of objects with complex surfaces, it is often essential to determine the spatial locations of points on the surface. In order to reproduce or fabricate a surface with substantial precision, it is necessary to specify a substantially large number of closely-spaced points.

Heretofore, the measurements of points on a complex surface was carried out in a laborious manner by recording the positions of the points methodically until the surface has been specified with the required amount of precision. The taking of measurements of the points on the surface often involved making contact with the surface with an instrument, for example. The final amount of recorded data, furthermore, was voluminous and difficult to analyze. In view of the large amount of data which had to be recorded with respect to a large number of points in order to achieve a predetermined precision, it was particularly susceptible to the introduction of measuring and recording errors.

Accordingly, it is an object of the present invention to provide an arrangement in which an object is subdivided into a substantially large number of sections, so that points on the surface of the object may have their positions determined with substantially high resolution.

Another object of the present invention is to provide an arrangement in which each of the subdivided sections of the object is assigned a predetermined code which defines the section uniquely from the other sections.

A further object of the present invention is to provide an arrangement of the foregoing character in which the object is subdivided into sections with a minimum number of masks applied to achieve a predetermined resolution of sections and accompanying precision.

A still further object of the present invention is to provide an arrangement, as described, in which the spatial positions of points within each section may be determined by correlating the points to a reference surface photographed by cameras in cooperation with the projectors and masks.

An essential object of the present invention is to provide an arrangement as described above in which the location of a point on the object is determined with substantially a high degree of precision within a subdivided section by arranging that the subdivided sections overlap.

SUMMARY OF THE INVENTION

The objects of the present invention are achieved by arranging a plurality of projectors with masks about the object with the surface to be geometrically analyzed. Each projector projects a collimated beam through the respective mask and applies, thereby, a projected pattern onto the object, which subdivides the object into predetermined sections. For each mask that is applied, the projector illuminates preselected sections of the object. The illuminated and non-illuminated sections combine to form a predetermined pattern corresponding to an assigned code. The masks are advanced in the projector in sequence, and produce a separate pattern of illumination on the object for each applied mask. The different patterns, when taken in combination, subdivide the object into a substantially large number of sections, in accordance with a predetermined digital code. The code is selected, in accordance with the present invention, so that a large number of subdivided sections are obtained for a relatively few number of masks or projected patterns on the object.

Each pattern of sections associated with a mask, is photographed by cooperating cameras which have the entire surface within their field of view. The photographs taken by the cameras may be correlated to photographs taken similarly of a reference object to establish the spatial locations of points on the surface of the object.

The projectors spaced about the object with the surface to be analyzed, have cooperating masks so that the illuminated pattern from one projector cooperates correspondingly with the illuminated pattern of the remaining projectors. The plurality of projectors positioned about the object, serve to cover the entire surface of the object.

Selective illumination of the surface by the projectors may be carried out by any one of various forms of electromagnetic radiation available, and the subdivision of the object into sections may be carried out along advantageous axes.

In a particularly advantageous embodiment of the present invention, the subdividing sections which illuminate the object, are arranged to overlap for the purpose of providing a substantially high degree of precision in determining the location of a point on the object within a subdividing section. Images of the illuminated or irradiated sections are recorded, and then scanned to define the location of predetermined points within overlapping regions of the subdivided sections. The location of the points within the overlapping regions is dependent on a predetermined relationship of irradiated intensities of the points obtained during the scanning process and independent of background light and color effects.

The novel features which are considered as characteristic for the invention are set forth in particular in the appended claims. The invention itself, however, both as to its construction and method of operation, together with additional objects and advantages thereof, will be best understood from the following description of specific embodiments, when read in connection with the accompanying drawings.

DESCRIPTION OF THE PREFERRED EMBODIMENTS

Figure 1:
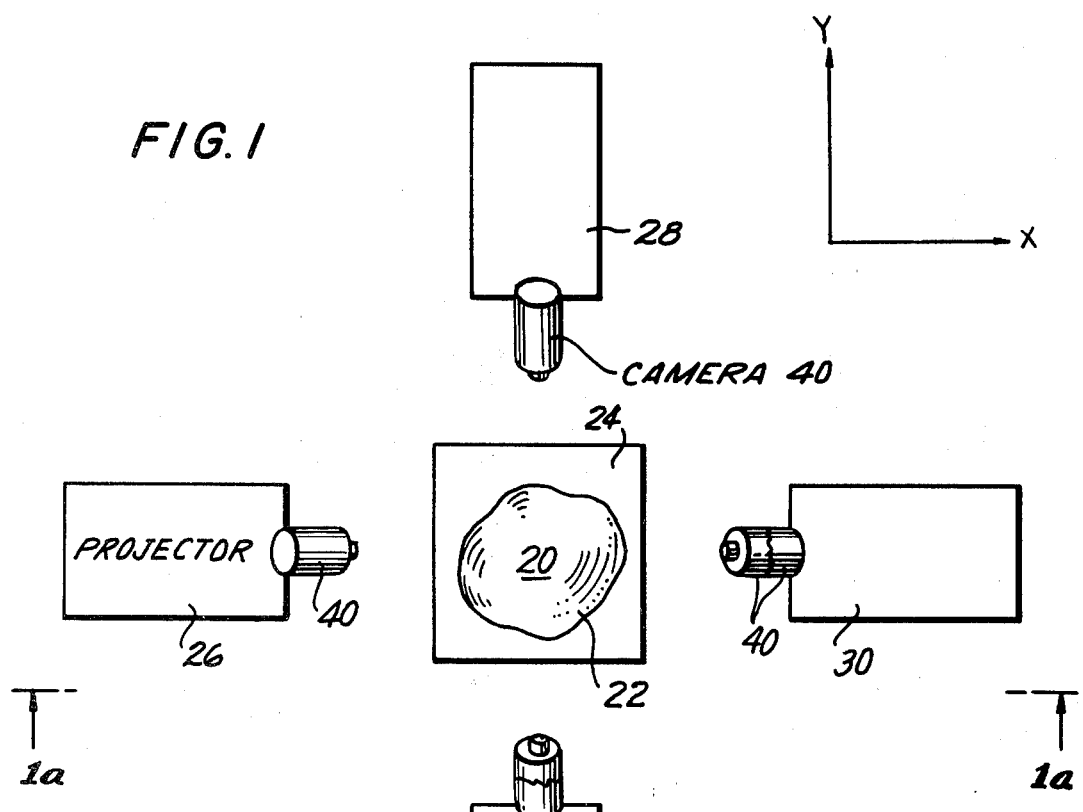
FIG. 1 is a schematic plan view and shows the relative arrangement of the surface to be analyzed or investigated, the projectors, and the cameras, in accordance with the present invention.
Figure 1A:
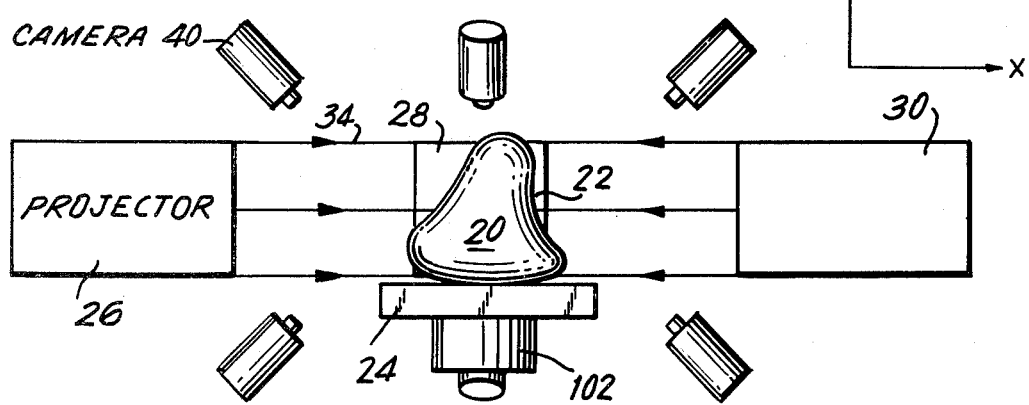
FIG. 1a is a schematic elevational view taken along line 1a—1a in FIG. 1.

Referring now to the drawing and in particular to FIG. 1, an object 20 with surface 22 to be geometrically analyzed, is placed on a support 24. Projectors 26, 28, 30, 32 are positioned in spaced relationship about the object 20 for the purpose of covering the entire surface of the object or a predetermined portion thereof. Each projector applies a collimated illuminating beam 34 to the object 20. In the paths of the collimated illuminating beams, are masks 36 which may be advanced in sequence on the projectors.

Figure 3:
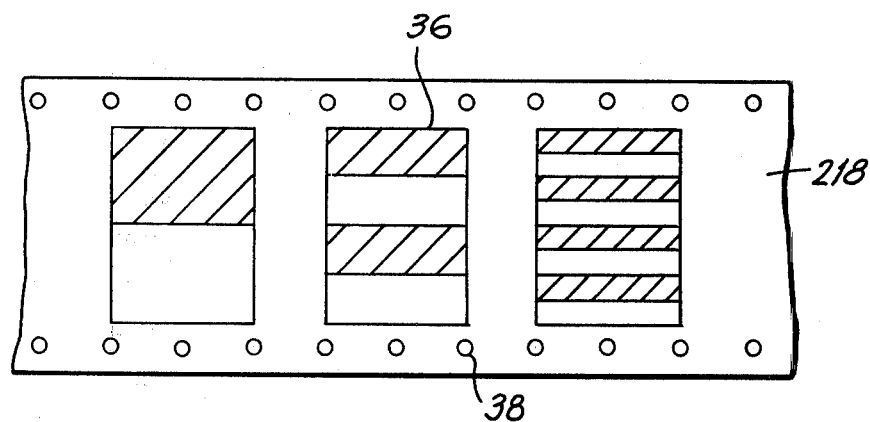
FIG. 3 is a partial plan view of coding masks on a carrier transported in the projectors of FIG. 1.

Each mask 36 may be conveniently placed on a rolled strip of film 218, as shown in FIG. 3 for example. The masks may be advanced in sequence in the respective projector, in an accurately registered manner, by means of sprocket holes 38 located along the edges of the strip of film. The film can be rolled and stored on reels in a conventional manner. The advancing or transporting of film in the light path of a projector is well known in the art, and for this reason is not described in further detail here. At the same time, separate slides each containing a separate mask may be used in conjunction with a projector instead of a strip of film containing a plurality of sequenced masks.

During the period of time that a particular mask is present in a projector, preselected portions of the surface 22 are illuminated by the illuminating beam applied by the projector through the mask. The illumination of the preselected sections is carried out on the basis that the surface 22 is to be subdivided into a substantially large number of sections for a relatively few number of masks. Thus, a relatively few number of masks or illuminating patterns used in conjunction with the projector, provide sufficient data for subdividing the surface 22 into a substantially large number of sections or intervals to obtain sections of high resolution. When the projectors 26, 28, 30 and 32 are operated cooperatively, all projectors are provided with identical masks having identical patterns thereon. This arrangement permits covering the surface of the object and avoids shadow effects which may arise when using only a single projector.

The relationship between the number of masks 36 used in conjunction with a projector, and the number of subdivided sections of the surface 22 is obtained in the following manner.

Figure 2:
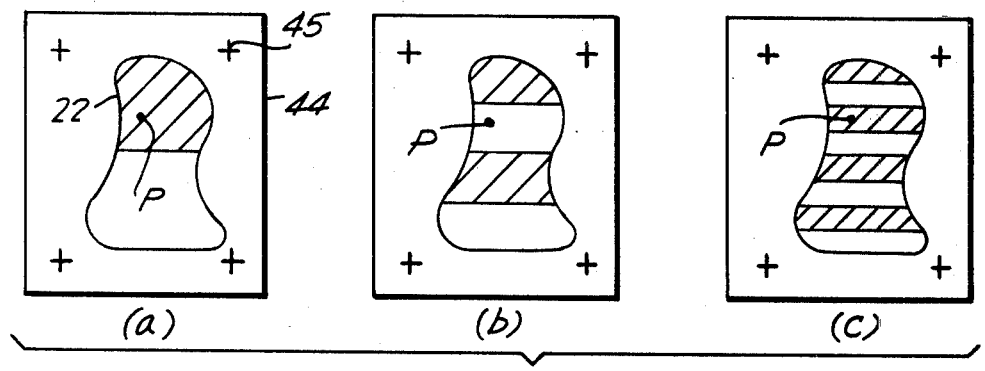
FIG. 2 shows plan views of typical photographs taken by a camera in the arrangement of FIG. 1.

If the surface 22 is to be subdivided into N sections corresponding to a predetermined precision of resolution, then this quantity N may be expressed by the series of binary terms $N = 2^0 + 2^1 + 2^2 + 2^3 + 2^4 \ldots$ From this series of binary terms, it may be seen that a substantially large number N may be obtained for a relatively few terms present in the sequence. To apply this principle to the present invention, each binary term in the sequence is made to correspond to a single mask pattern projected on the surface 22. For each mask, a predetermined pattern of illumination is applied, corresponding to the particular binary term involved. Thus, for the binary term $2^1$, for example, the illuminating pattern of FIG. 2a is produced. In this pattern, the surface 22 is subdivided into two sections or intervals. The illuminated section in FIG. 2 is shown in cross-hatched form. The non-illuminated section is left vacant. In a similar manner, the binary term $2^2$ is represented by the illuminating pattern of FIG. 2b. In FIG. 2b, the surface 22 is subdivided into four sections. FIG. 2c corresponds, accordingly, to the binary term $2^3$, and in this FIG. 2c, the surface 22 is subdivided into eight sections or intervals.

Each illuminating pattern as represented by FIGS. 2a, 2b, and 2c, for example, is photographed by cameras 40 which have the entire surface 22 within their field of view. Whereas only three patterns are represented in the drawing to correspond to three separate binary terms, in practice the cameras 40 photograph each pattern separately for as many binary terms as are necessary to obtain the quantity N. For each photograph taken by the cameras 40, moreover, the projectors 26, 28, 30, 32 project onto the object, a single pattern of a single mask.

The sectionalized pattern on the masks may be obtained, for example, by producing the film or slides with alternating sections or areas that will transmit and inhibit the transmission of light. The photographs 44 taken by the cameras 40 of the sectionalized patterns appearing on the object 20, are shown in FIG. 2.

In the use of the pure binary code to express the number N of subdivisions of the surface 22, as described above, each subdivision or band is assigned a unique code which serves to identify uniquely each band from the other remaining bands. Thus, bands numbered 5, 6 and 7 have, respectively, assigned codes 101000, 011000, and 111000. In a similar manner, every other band from the first one to the last one (band N) has a uniquely assigned binary code.

In accordance with the present invention, therefore, a relationship exists between the binary coded bands and the number of photographs 44 taken by the cameras 40. The relationship makes it possible for a relatively small number of photographs to include complete information of a substantially large number of bands. Thus, only ten photographs are required, for example, to specify completely 1,000 bands. The coded information on the bands may be inserted into a computer and applied in the following manner.

Figure 4:
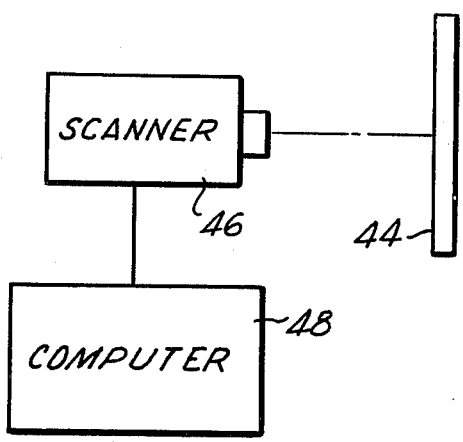
FIG. 4 is a schematic view and shows the arrangement for scanning the photographs of FIG. 2.

The photographs 44 are scanned in sequence by means of a photoelectric cell or an electron beam scanner 46 or other conventional scanning device, for example, and the scanned information is inserted into a computer 48, as shown in FIG. 4. A point P, for example, on the surface 22 will also appear in the photographs 44 taken by the cameras 40. Depending upon the particular photograph taken in the sequence of patterns as shown in FIG. 2, for example, the point P will appear within different shaded and non-shaded bands. If a shaded band is assigned the digit "1" and a non-shaded band is assigned the digit "0", then referring to FIG. 2, it is seen that in FIG. 2a the point P lies within a shaded band, so that a "1" may be assigned to FIG. 2a. Similarly, since the point P lies within a non-shaded band in FIG. 2b and within a shaded band once again in FIG. 2c, the digits "0" and "1" may be assigned, respectively, to FIGS. 2b and 2c in relation to point P. If the point P does not appear subsequently within a shaded band in any of the additional photographs which may be taken by the camera 40, then the position of the point P may have the code 101000 assigned to it. From this latter code, it may be observed that this binary code represents band number 5, and therefore point P must lie within this band number 5.

In practice, the scanner 46 detects or senses the point P on the photographs 44 which are scanned in sequence. The scanner 46 senses whether the point P lies within a shaded or a non-shaded band. The resultant information is inserted into the computer 48. The computer correlates the sequence of the photographs scanned, in relation to whether point P appears in a shaded or non-shaded band, and generates from this the binary coded number which defines a particular number of the band in which point P lies, such as band number 5 in the preceding example. From the information stored in the computer, the surface 22 may be readily reconstructed since each band is uniquely defined and the point P, therefore, will appear in the correct band on the reconstructed surface.

The scanning of photographic images for sensing information thereon as, for example, the point P, is well known in the art and is, for this reason, not described in further detail here. Furthermore, the scanner 46 may be in the form of an electron beam scanner, photoelectric or other optical scanner, for example. Registration marks 45 provided on the photographs serve as a reference for positioning the photographs in predetermined location prior to scanning.

To form the subdividing bands, projected onto the surface 22 of the object 20, the masks 36 have rectangular-shaped areas through which illumination or light is transmitted, as shown in FIG. 3. In FIG. 3 areas that will not transmit light in the masks are cross-hatched, for example, whereas areas which will transmit light are left blank. After passing through such a rectangular-shaped light-transmitting area 128 of the masks, the light beam 130 diverges, if unfocused, prior to striking the surface 22. If focused, it converges to a focal point and so may be converging or diverging prior to striking the surface 22. As may be seen from FIG. 5, and FIG. 6 the light beam 130 occupies an element of volume in the form of a divergent slice, for example, after passage through the mask. This element of volume then intersects or strikes the surface 22, and it is the intersection of the element of volume 130 and the surface 22 which forms the subdividing band or a portion thereof. Thus, the intersection of the element of volume 130 and the surface 22 comprises a surface of intersection for band 132 on the object 20.

Figure 5:
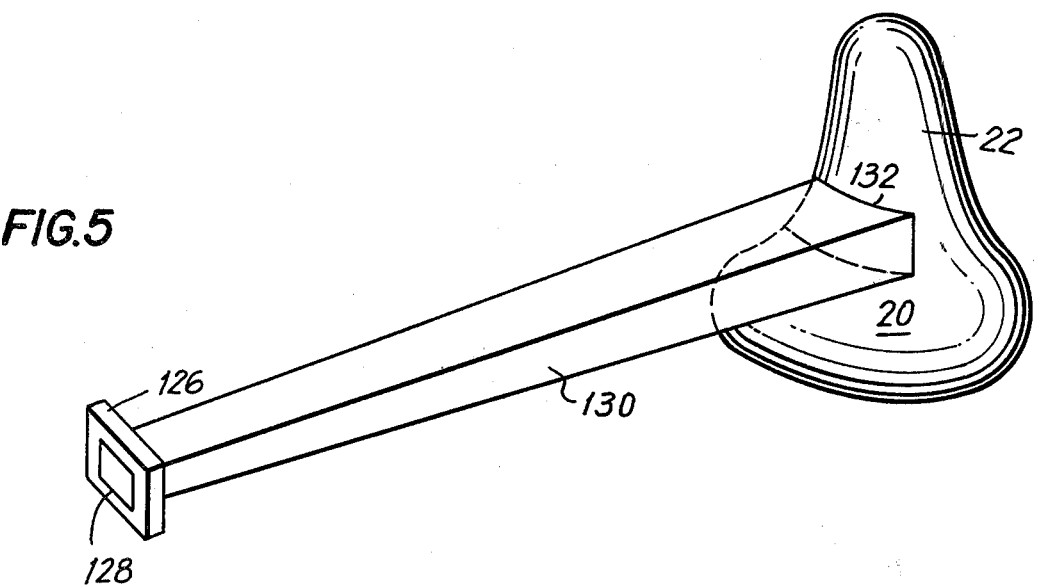
FIG. 5 is a perspective view and shows the intersection of a solid object with an element of volume of illumination in an unfocused arrangement.
Figure 6:
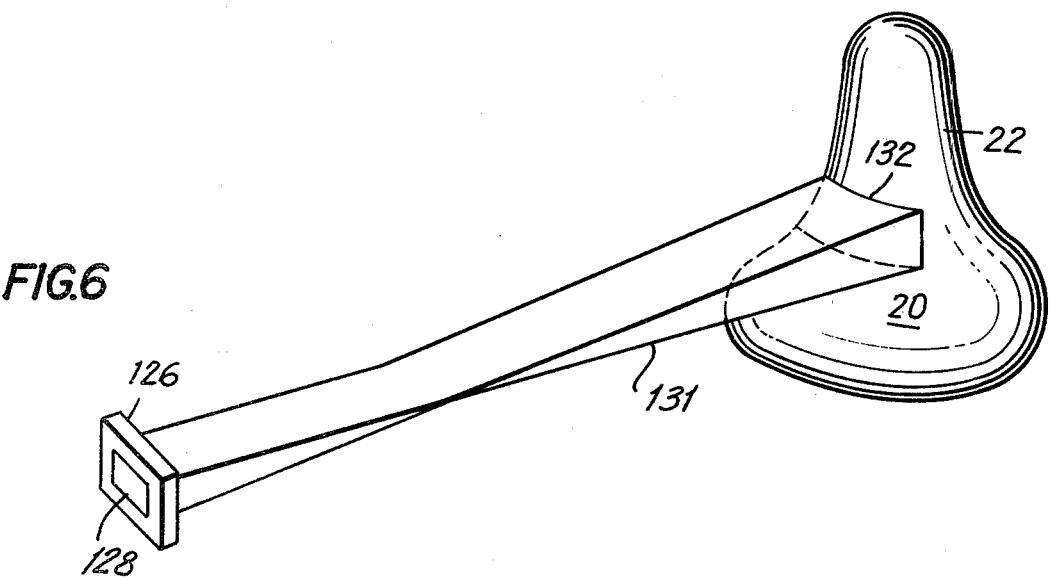
FIG. 6 is a perspective view and shows the intersection of a solid object with an element of volume of illumination in a focused arrangement.

FIG. 6 may be applied in a similar manner as FIG. 5. In contrast to FIG. 5 which shows an unfocused light beam 130, FIG. 6 shows a focused light beam 131 emerging from the projector optical system.

As a result of the shape of the volumetric element 130, the band 132 illuminated on the object 20 possesses a finite depth. Therefore, the location of a point P within such a band can be specified only to an accuracy permitted by the depth or resolution of the band as illustrated in FIG. 2, for example. To further subdivide such a band and thereby enable the point P to be located with greater precision, there is provided in accordance with the present invention, an arrangement in which a plurality of band patterns, in predetermined phase relationships, are applied to the object. The principle of operation of this arrangement is shown in FIG. 7.

Due to the physical and optical characteristics of the surface, projector, camera, film, and film scanning mechanism, which take into account imperfections and fringe effects, for example, the scanned readout of the intensity of illumination within the depth of the recorded band varies in accordance with the portion of the waveform shown in FIG. 7a between points 134 and 136 which mark the ends or borders of the band. Between these two borders, the intensity varies from a minimum to a maximum level, and then back to a minimum level. The level 138 above the axis 141 results from prevailing noise conditions, ambient light, and/or imperfections in the optical system of the projector, camera, or scanning mechanisms.

Consequently, if the masks are operated relative to the object 20 for the purpose of applying a pattern of subdivided bands onto the object, the pattern of bands as recorded and scanned by the method of FIG. 4, will result in the waveform of FIG. 7a.

Figure 7:
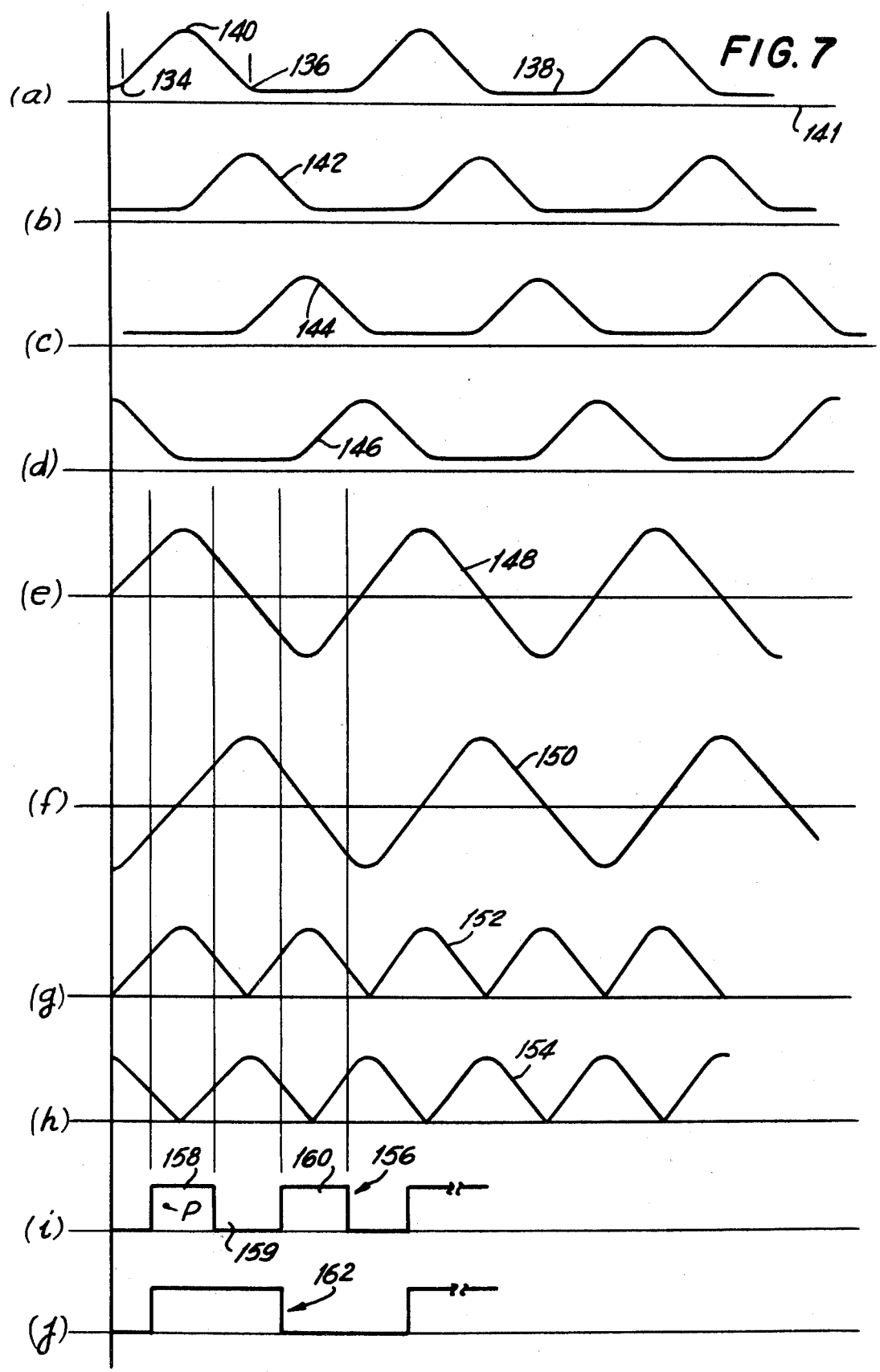
FIG. 7 is a diagramatic view of related waveforms for obtaining improved resolution in defining the location of a point on a surface, in accordance with one embodiment of the present invention.

In accordance with the present invention, a first mask is used to apply the pattern of bands of FIG. 7a. Three additional masks are then used to apply band patterns displaced in phase from each other, as shown in FIGS. 7b-d. In this procedure, the first mask applies to the object a pattern of bands denoted by the waveform 140 in FIG. 7a. Thereafter, the second mask applies to the object the band pattern 142 shown in FIG. 7b. The band pattern 142, however, is displaced in phase by a predetermined amount, with respect to the waveform for band pattern 140. In a similar manner, band patterns 144 and 146 are obtained by applying the remaining two masks. As may be seen from FIG. 7, waveforms 140, 142, 144, 146 are displaced in phase from each other progressively by equal increments within one period or cycle of the waveform. Thus, an additional phase displacement of that same increment with respect to the waveform 146, will result in a return to the waveform 140.

In processing the information contained in waveforms 140, 142, 144, 146, the two waveforms 140 and 144 are subtracted from each other to result in the waveform 148 in FIG. 7e. For this purpose, waveform 144 may be inverted and then added to waveform 140. The result is the same as subtracting waveform 144 from waveform 140. Since each of the waveforms in FIGS. 7a-d are displaced in phase progressively by 90°, waveform 144 is displaced by 180° from waveform 140. As a result of this particular phase displacement between these two waveforms, the subtraction of waveform 144 from waveform 140 causes the cancellation or removal of the level 138 from the signal 148. This feature may be seen, for example, when a negative sign is assigned to the ordinates of waveform 144, and these negative ordinates are then algebraically added to the respective positive ordinates of waveform 140. In a similar manner, waveform 146 is subtracted from waveform 142, to provide the resultant waveform 150 shown in FIG. 7f.

The subtraction of the waveforms as carried out above, where the waveforms are displaced by a maximum amount from each other as, for example, 180°, provides signals 148 and 150 having a peak-to-peak amplitude which is twice that of the original signals, and which possesses, moreover, steep regions resulting in advantages to be described.

After signals 148 and 150 have been obtained, the negative portions of these signals are converted to positive portions so as to result in the respective waveforms 152 and 154. Accordingly, waveform 152 is obtained by flapping the negative portions of the respective waveform 148 up to the positive region of the plane. This same condition may be expressed in other terms by converting the waveform 148 to one having only absolute values. The two waveforms 152 and 154 are then compared to obtain the pulse-shaped waveform 156 shown in FIG. 7i.

The comparison of waveforms 152 and 154 is carried out by noting which waveform has the greater ordinate at any one instant. When, for any ordinate, the absolute value of waveform 152 is greater than that of waveform 154, a high level of "1" is assigned to the pulse-shaped waveform 156. When, on the other hand, the absolute value or signal 154 is greater, for any ordinate, than the respective value of signal 152, then a low level or "0" is assigned to the pulse-shaped waveform 156.

In viewing waveform 156, it may be seen that a single cycle of the waveform 140 has been subdivided into substantially four increments.

If upon standing or examining the waveform 156 by apparatus similar to that described in conjunction with FIG. 4, it is found that point P lies within a portion of a waveform beneath the high or "1" level, it is still not possible to determine whether point P lies within the portion 158 or within the portion 160 of the waveform 156. Additional information is required in conjunction with the waveform to FIG. 7i, and such information is obtained from FIG. 7j. The waveform 162 of this figure is obtained by examining signals 148 and 150 to determine the sign of the portion of the signal which has the largest ordinate. If the sign is positive of the larger ordinate, then a high level or "1" is assigned. If, on the other hand, the signal 148 or 150 has a negative sign when possessing the largest ordinate, then a low level or "0" is assigned. Thus, in examining signals 148 and 150 during the interval corresponding to the portion 158 of the waveform 156, it is seen that signal 148 has the larger ordinates during that interval, and that during this interval, furthermore, signal 148 is positive. Accordingly, the portion of waveform 162 corresponding to portion 158 is assigned a high or "1" level. If the low level portion 159 of the waveform 156 is next examined in relation to signals 148 and 150, it is seen that the ordinates of signal 150 are larger and have a positive sign. Accordingly, waveform 162 is also assigned a high level for this corresponding portion 159. When viewing portion 160 of waveform 156 next, it is seen that signal 148 has the larger ordinate during that portion, and these ordinates of signal 148 are negative. Accordingly, a low level or "0" is asssigned to waveform 162 for the interval corresponding to the portion 160.

By now examining the two waveforms 156 and 162, it may be seen that it is possible to determine that point P lies indeed in the portion 158 and not in 160, since only during that interval corresponding to portion 158, will the point P also appear within a region in waveform 162, beneath a high level or "1" level. In principle, the two waveforms 156 and 162 when taken together provide signals of fine and coarse resolutions, respectively.

Figure 8:
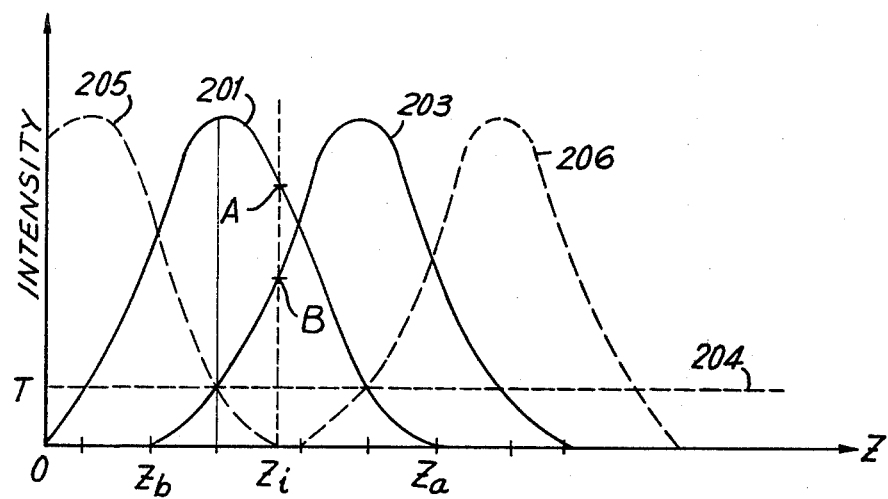
FIG. 8 is a diagramatic view of related overlapping waveforms for obtaining improved resolution in defining the location of a point on a surface, in accordance with another embodiment of the present invention.
Figure 9:
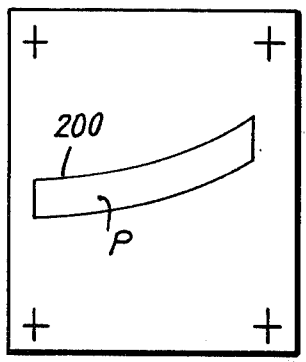
FIG. 9 is a plan view of a photograph taken of an illuminated section of the objects surface containing a point to be located on the surface.
Figure 10:
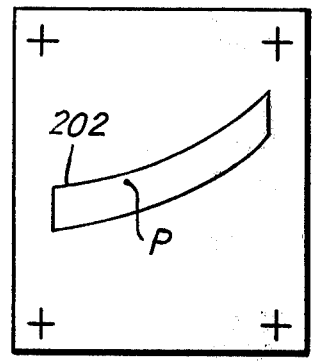
FIG. 10 is a plan view of a photograph taken with a section of the object surface illuminated, when overlapping with the section shown in FIG. 9 and corresponding to the embodiment of FIG. 8.

In accordance with another embodiment of the present invention for subdividing a band so as to determine the location of a point P with greater precision by locating the point P within the band, the arrangement of FIGS. 8–10 is provided. In this arrangement, a point P on the surface 22 of the object is illuminated by a band of light 200, and a photograph is taken with a camera as the point P appears in relation to that band 200. The band 200 may be projected by means of a mask, as already described. The photograph taken of the point P illuminated by the band 200 appears as shown in FIG. 9.

After having taken the photograph of FIG. 9, the point P is illuminated by another band of light 202 which is displaced from the band of light 200, but which overlaps the band 200. A photograph is then taken of the point P as it appears within the band 202, as shown in FIG. 10. The band 202 displaced from the band 200 may be projected on the surface 22 of the object by means of another mask on which the light transmitting area is displaced from the corresponding area on the mask carrying band 200. It is essential for this arrangement, in accordance with the present invention, that the two bands 200 and 202 overlap substantially while being displaced from each other.

The intensity of light within the projected bands is shown in FIG. 8 as a plot of intensity versus Z axis position. FIG. 8 can be obtained by separately energizing each band of light and moving a photocell in the Z direction to transverse the light band and thereby provide an output waveform proportional to the incident intensity.

The light intensity scan across the band 200 has the waveform 201 as shown in FIG. 8. Similar scanning of the band 202 results in the waveform 203 in FIG. 8. Since the two bands overlap, as noted above, the waveforms 201 and 203 overlap correspondingly. As shown in FIG. 8, the waveform of an illuminated band commences at substantially zero or low intensity, reaches a maximum intensity at substantially the center of the band, and then returns to zero or low intensity at the opposite end of the band. In the embodiment of FIGS. 8–10, the bands 200 and 202 are displaced from each other along the Z axis. Consequently, the waveforms in FIG. 8 are plotted along the Z axis, and the ordinates of the waveforms correspond to relative light intensities received at any arbitrary location in the plane defined by constant Z. It is these relative light values as plotted that are reflected by the object points into the camera lens and thereby recorded. Thus, scanned light values from the same object point on the Film Frames of FIGS. 9 and 10 relate to FIG. 8 via waveforms 201 and 203.

Figure 11:
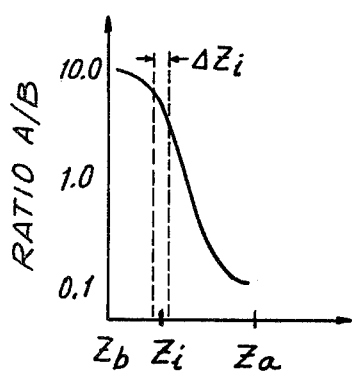
FIG. 11 is a diagramatic view of a function relating the ratios of light intensities of points within overlapping subdividing sections.

Referring to FIG. 8, the light intensity of the point P at $Z = Z_i$ within the band 200 corresponds to the level A on the waveform 201, as determined by the scanner 46, for example, in FIG. 4. Similarly, the light intensity of the point P within the band 202 corresponds to the level B on the waveform 203. The ratio of the intensities, A/B, can then be computed and plotted as shown in FIG. 11. If the width of the band is designated as $Z_a$, then the location of the point P within that band has an uncertainty by the amount $Z_a$, in the absence of further steps taken to refine the measurement. By providing the overlapping bands, however, in accordance with the present invention, the location of the point P is specified at the position $Z_i$ within the width $Z_a$ of the band. Thus, the ratio A/B of light intensities determines uniquely the position of a point P within a band. If the ratios A/B are plotted for points within the overlapping portion $Z_a$-$Z_b$ of the waveforms 201 and 203, the graph of FIG. 11 results. Accordingly, within the overlapping bands 200 and 202, a point P can be uniquely located with substantial precision. By increasing the number of subdividing and overlapping planes, a point P on the object surface 22 may be obtained with greater precision. The number of such subdividing and overlapping planes is substantially limited only by the signal/noise ratio. The noise threshold level is represented in FIG. 8 by means of a dashed line 204. Waveforms 205 and 206, shown in dashed form, correspond to the use of addition overlapping bands for extending the Z axis range; 205 overlaps 201 and 206 overlaps 203. The noise level 204 results in a corresponding uncertainty in the projection system, time variations in background light, or electrical circuit noise.

If the waveform functions in FIG. 8 are denoted by the symbol F, then the useful overlapping regions of waveforms 201 and 203 in FIG. 8 may be defined and located during the scanning process as follows:

$$F_{203} > F_{205} \text{ AND } F_{201} > F_{206}$$

In the preceding relationships for defining the overlapping regions, the term "AND", is to be considered as the logical definitions of the term.

It should be noted that the vernier techniques of FIGS. 8 through 11 assume a linear recording of light values. Should the recording media be non-linear, it is necessary to perform the corrections required to linearize the data. For example, film with a given logarithmic recording characteristic could have its data corrected via a table or curve having the required inverse logarithmic characteristic.

The ratios A/B can be conveniently computed by means of a computer 48, for example, connected to the scanner 46 in FIG. 4. This computer can also store successive values of these ratios as a function of the coordinate Z, for example. Thus, the computer can be used to store the relationship shown in FIG. 11. When the scanner 46 senses the intensities A and B from successive photographs as in FIGS. 9 and 10, for example, the computer can then provide the location $Z_i$ of the point P, after computing the respective ratio A/B.

The arrangement of FIGS. 8-11, therefore, may be considered as a vernier method for measuring the location of a point with a precision that is greater than is possible when subdividing the surface 22 of the object with non-overlapping bands.

In producing the overlapping bands, a sequence of masks may be used in a stationary projector, or the projector may be moved, in the event that successive masks are not to be used. In either case, the camera which photographs the point P within the bands, is held stationary. When moving the projector for generating the overlapping bands, for example, the projector is advanced each time by a substantially small distance so as to provide for the overlapping effect. The projector at the same time, projects at each position, a band of constant width, for example.

By using the arrangement of FIGS. 8-11, it is seen that by taking the ratio A/B, the location of a point within a band may be uniquely determined. It is also possible to uniquely determine the location of the point within the band by computing the following ratio of the light intensity levels of the point P within the bands 200 and 202:

$$(A-B)/(A+B)$$

Figure 12:
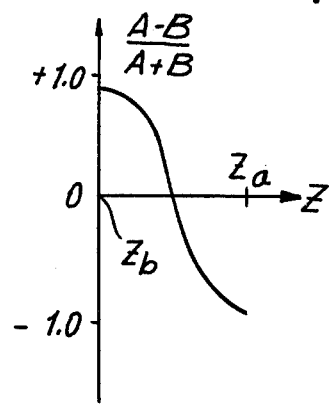
FIG. 12 is a diagramatic view of a further function relating the light intensities of points on the object surface within overlapping subdividing sections.

This ratio provides that the numerator be computed as the difference of the levels A and B, whereas the denominator is computed as the sum of the levels A and B. A graphical plot of this ratio over the region $Z_a$-$Z_b$ is shown in FIG. 12. As may be seen from this FIG. 12, the expression $(A-B)/(A+B)$ also uniquely defines the location of the point within the band. The expression $(A-B)/(A+B)$ may be conveniently computed by means of the computer 48 when connected in the arrangement as shown in FIG. 4. In addition, the special case $A-B=0$ provides a sharp means of Z discrimination, even with uncorrected non-linear data since when $A-B=0$ data points will always fall half-way inbetween the displaced bands as long as the bands have identical intensity plots.

By computing light intensity ratios as described above, in accordance with the present invention, background light effects are cancelled out. Furthermore, the effects of colors associated with the surface at the point P are also cancelled out. Consequently, the computed ratio, in accordance with the present invention, define the location of a point within a band, uniquely and independent of background light and color effects. The graphs of FIGS. 11 and 12 for uniquely defining the location of a point, may be both conveniently stored within the computer 48 in FIG. 4, for example.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for locating points on a surface comprising the steps of: irradiating selectively and subdividing a surface into a number of sections; overlapping subdivided sections so that a region of one section overlaps the region of a neighboring section; recording images of the irradiated sections; and scanning said images to define the location of predetermined points within overlapping regions of said subdivided sections; the location of said points within overlapping regions being dependent on a predetermined relationship of irradiated intensities of said points obtained during said scanning and independent of background light and color effects.

2. A method as defined in claim 1 including the steps of: determining during scanning the irradiated intensity of said points when located in one subdivided section; determining during scanning the irradiated intensity of said points when located within an adjacent subdivided section overlapping the area of said one subdivided section on said surface; computing the value of said predetermined relationship of the irradiated intensities determined during scanning; generating a function of values of said relationship with respect to positions of said points; determining the irradiated intensities of a point to be located in said one and overlapping sections and computing the value of said relationship from said intensities; referring the last-mentioned computed value to said function and deriving the position of said point from said function.

3. A method as defined in claim 1 wherein the irradiated intensity varies over the area of the subdivided section.

4. A method as defined in claim 1 wherein the number of overlapping subdividing sections is dependent on the ratio of signal to noise of the irradiated sections.

5. A method as defined in claim 2 wherein said relationship corresponds to A/B, where A is the irradiated intensity of a point determined during scanning of said one section, and B is the irradiated intensity of the point determined during scanning of said adjacent section, said one section and said adjacent section being irradiated separately, said point being within an overlapping region of said one section and said adjacent section.

6. A method as defined in claim 2 wherein in said relationship corresponds to $(A-B)/(A+B)$, where A is the irradiated intensity of a point determined during scanning of said one section, and B is the irradiated intensity of the point determined during scanning of said adjacent section, said one section and said adjacent section being irradiated separately, said point being within an overlapping region of said one section and said adjacent section.

7. A method as defined in claim 2 including the step of storing values of said predetermined relationship; and comparing thereafter the stored values with a value of said relationship computed from irradiated intensities determined during scanning.

8. An arrangement for locating points on a surface comprising means for irradiating selectively and subdividing a surface into a number of sections, said subdivided sections being overlapped so that a region of one section overlaps the region of a neighboring section; means for recording images of the irradiated sections; and means for scanning said images to define the location of predetermined points within overlapping regions of said subdivided sections; the location of said points within overlapping regions being dependent on a predetermined relationship of irradiated intensities of said points obtained during said scanning and independent of background light and color effects.

9. An arrangement as defined in claim 8 including means for determining during scanning the irradiated intensity of said points when located in one subdivided section; means for determining during scanning the irradiated intensity of said points when located within an adjacent subdivided section overlapping the area of said one subdivided section on said surface; means for computing the value of said predetermined relationship of the irradiated intensities determined during scanning; means for generating a function of values of said relationship with respect to positions of said points; means for determining the irradiated intensities of a point to be located in said one and overlapping sections and computing the value of said relationship from said intensities; means for referring the last-mentioned computed value to said function and deriving the position of said point from said function.

10. An arrangement as defined in claim 8 wherein the irradiated intensity varies over the area of the subdivided section.

11. An arrangement as defined in claim 8 wherein the number of overlapping subdividing sections is dependent on the ratio of signal to noise of the irradiated sections.

12. An arrangement as defined in claim 9 wherein said relationship corresponds to A/B, where A is the irradiated intensity of a point determined during scanning of said one section, and B is the irradiated intensity of the point determined during scanning of said adjacent section, said one section and said adjacent section being irradiated separately, said point being within an overlapping region of said one section and said adjacent section.

13. An arrangement as defined in claim 9 wherein said relationship corresponds to $(A-B)/(A+B)$, where A is the irradiated intensity of a point determined during scanning of said one section, and B is the irradiated intensity of the point determined during scanning of said adjacent section, said one section and said adjacent section being irradiated separately, said point being within an overlapping region of said one section and said adjacent section.

14. An arrangement as defined in claim 9 including means for storing values of said predetermined relationship; and means for comparing thereafter the stored values with a value of said relationship computed from irradiated intensities determined during scanning.

* * * * *